United States Patent [19]
Levine

[11] Patent Number: 6,128,730
[45] Date of Patent: Oct. 3, 2000

[54] METHOD AND APPARATUS FOR MULTILEVEL SOFTWARE CONFIGURATION HAVING ADMINISTRATOR AND SOFTWARE DRIVEN OVERRIDE LIMITING CAPABILITIES

[75] Inventor: Donald P. Levine, Glendale, Ariz.

[73] Assignee: Bull HN Information Systems Inc., Billerica, Mass.

[21] Appl. No.: 09/135,212

[22] Filed: Aug. 17, 1998

Related U.S. Application Data

[63] Continuation-in-part of application No. 08/999,248, Dec. 29, 1997.
[51] Int. Cl.[7] .................................................. G06F 9/00
[52] U.S. Cl. .................................................. 713/1; 709/108
[58] Field of Search ........................... 713/1, 100; 709/1, 709/100, 102, 103, 104, 105, 106, 107, 108; 395/569; 340/825; 707/200, 203; 345/326

[56] References Cited

U.S. PATENT DOCUMENTS

| | | | |
|---|---|---|---|
| 5,459,854 | 10/1995 | Sherer et al. . | |
| 5,634,098 | 5/1997 | Janniro et al. . | |
| 5,680,547 | 10/1997 | Chang | 395/200.01 |
| 5,740,431 | 4/1998 | Rail | 395/616 |
| 5,748,980 | 5/1998 | Lipe et al. | 395/828 |
| 5,832,264 | 11/1998 | Hart et al. | 395/683 |
| 5,913,218 | 6/1999 | Carney et al. | 707/200 |
| 5,923,850 | 7/1999 | Barroux | 395/200.54 |
| 5,996,012 | 11/1999 | Jarriel | 709/226 |

OTHER PUBLICATIONS

"Database Products INTEREL Operational Directory Interface (ODI) Administrator's Guide ODI Introduction and Reference GCOS8", Apr. 1995, Bull HN Information Information Systems Inc., Copyright 1992, 1995.

*Primary Examiner*—Reba I. Elmore
*Assistant Examiner*—Rita A Ziemer
*Attorney, Agent, or Firm*—Faith F. Driscoll; John S. Solakian

[57] ABSTRACT

A configuration system and method uses a program device containing configuration software for configuring applications to be executed by a processing system through the use of externally provided values corresponding to environment variables that are used to define an execution environment for all of the applications to be executed by the system. The configuration system is used to establish a plurality of configuration file sources to be used in configuring applications wherein the files define a plurality of different operational levels. Each configuration file stores the values representative of a corresponding number of configurable items defining the environment for executing the applications. The values of each level has a pre-established override capability over the values of other levels. In response to application calls, the configuration system processes the configuration item values stored in corresponding locations of the plurality of configuration files according to the pre-established override capability of the different operational levels. The final values for the number of configuration items produced by such processing are then returned to the calling application for use during execution.

53 Claims, 9 Drawing Sheets

METHOD AND APPARATUS FOR MULTILEVEL SOFTWARE CONFIGURATION HAVING ADMINISTRATOR AND SOFTWARE DRIVEN OVERRIDE LIMITING CAPABILITIES

This patent application is a continuation-in-part of copending patent application entitled, "A Method and Apparatus For Improving the Performance of A Database Management System Through A Central Cache Mechanism," invented by Donald P. Levine and David A. Egolf, bearing Ser. No. 08/999,248 filed on Dec. 29, 1997 which is assigned to the same assignee as this patent application.

BACKGROUND OF THE INVENTION

1. Field of Use

The present invention relates to data processing systems and more particularly to configuration management techniques.

2. Prior Art

As well known in the art, special purpose as well as general purpose software needs a configuration mechanism in order to be flexible enough to be used in different environments, with different applications or to be run in a manner desired or required by a particular user or organization. Software configuration has been accomplished in various ways. Most configuration methods operate on a single level basis; that is, a value can be assigned with a possible default value when the value is not assigned. In addition, some configuration systems require direct access to the configuration representation system such as for editing a text based configuration file while still others utilize a database access via special utilities and programmable interfaces. Examples of the latter include workstation configuration in GCOS8 operating system software developed by Bull HN Information Systems Inc. and the Windows registry in Windows 95® software developed by Microsoft Corporation.

At least two main approaches have been used by the configuration systems that require direct access to the configuration representation systems. The first approach is to associate values to items that are known by the configuration system that is often closely tied to the software being configured. In this type of system, the configuration set of items must be known by the software being configured. In those instances where a user assigns a value to an unknown configuration item, the system will report an error condition.

The second approach utilizes "environment variables" to configure the environment for the different software components being used in the system. As well known in the art, environment variables are a set of strings termed "environment", distinct from the "arguments", that are made available to an application program (process) when it executes. In this type of system, values are assigned to a variable that may or may not be used by different software components. The configuration system is not responsible or required to validate the configuration items although it may perform some syntactic validation. Thus, in contrast to the first approach, if a user assigns a value to a configuration item (i.e., to an environment variable), that is not used by any software component executed, the configuration system reports no error condition. Hence, the second approach allows configuration systems, such as those used in UNIX® based systems, to utilize an environment variable style approach. But, it appears that the relative order of variable assignment might be significant. That is, there may be sections in the configuration file that allow the grouping of different types of configuration items, each beginning with a section header. Hence, records in one section would have a completely different meaning when placed in another section.

In addition to the above, there are other types of systems that use environment variables in connection with software testing and optimizing software for any one of a plurality of variant architectures. Such systems are described in U.S. Pat. Nos. 5,634,098 and 5,459,854. Another system utilizes an "environment file" created and maintained by software that reads it. The file is used to identify the "default System Environment" of users without special requirements. In addition, an environment file may be included in any userid for users of a specific userid to use an environment other than the system default. This arrangement is described in the publication entitled, "Operational Directory Interface (ODI) Administrators Guide", Order Number LC40, Rev. 2, published by Bull HN Information Systems Inc., Copyrighted 1992, 1995. While these arrangements are used to define environments, they are not specifically concerned with configuring different software components through the use of environmental variables.

Accordingly, it is a primary object of the present invention to provide a method and apparatus for configuring software components in a highly flexible manner.

It is a further object of the present invention to provide a method and apparatus for configuring software components in a manner that allows a user to exert greater control over the operating environment in which such software components are running.

It is still a further object to provide a method and apparatus for configuring software components which ensures that such software components run in a most efficient manner while still allowing the user great flexibility in establishing the operational environment for running such software components.

SUMMARY OF THE INVENTION

The above objects are achieved in a preferred embodiment of the present invention through configuration system software and a method of configuring software components. The system and method provide simple configuration setting and a multiple level override capability for combining the needs and requirements of a system administrator with the needs and requirements of particular users or particular tasks of individual users. The configuration system of the present invention eliminates the need for special purpose tools or utilities to change values and settings.

The configuration system of the preferred embodiment utilizes a computer program device comprising a computer storage media readable by a digital processing system that contains the configuration system software. The configuration system software when loaded into the processing system, automatically configures application programs (i.e., processes) through the use of externally provided values that correspond to environment variables normally used to define the execution environment for processes being executed.

In accordance with the teachings of the present invention, a plurality of configuration files are established which are to be used in configuring application programs to be executed by the digital processing system. The configuration system can be conceptually viewed as being organized into a plurality of different operational levels or layers" wherein each level is associated with a particular configuration source file. Each configuration source file stores the values representative of a corresponding number of configurable items for configuring the different application programs that are to be executed. The values of one level have a preestablished override capability over the values of other levels. Also, in the multilevel organization of the present invention, the existence of configuration files at any one of the levels is optional and the number of levels can vary as a function of the type of system, users and application programs being used.

In the preferred embodiment, there are three levels designated as the system level, the user level and the process level that define the different levels of operational control within the system. The system level is normally associated with a system administrator, a designated individual or group of individuals that have responsibility for setting the configuration system defaults for the entire system. Through there may be more than one file at the user and process levels, a maximum of one file is utilized at each of these levels for a particular application program execution. Initially, an administrator or user enters a number of values into the selected levels of configuration files for configuring application programs to be executed. This is accomplished by using environment variables at different levels that define the environment for executing application programs according to requirements and preferences.

The configuration system software processes the configuration item values stored in the plurality of configuration files and automatically resolves apparent conflicts among values according to the pre-established override capability accorded to the levels of the configuration files. In the preferred embodiment, values for a particular configuration item specified at the system level are overridden by values specified for the same configuration item at the user level and values specified at the system or user level may be overridden by the values specified for the same configuration item at the process level. For example, let us assume that a particular configuration item is set to the value of one at the system level and that the same configuration item is set to the value two and three at the user level and the process level respectively. In this example, the configuration system software would return a resulting value of three to an application program requesting the value associated with the configuration item. During its processing, the configuration system software stores the configuration item values into an allocated storage area for reference by the configuration system software when subsequently called by application programs during their execution.

Another aspect or "component" of the present invention is the combining of the override capability of the multilevel configuration system with two different types of constraints designated as an administrative constraint and a software constraint. For some configuration items, the override capability of the multilevel configuration system may be suitable. But, for other configuration items, it may be desirable for the system administrator to set values at the system level that cannot be overridden at either the user or process levels normally associated with the user that runs programs on the system. In such instances, the administrator can constrain those particular configuration items syntactically. In the preferred embodiment, configuration items normally are assigned values by specifying the name of the configuration item followed by an equals sign symbol ("="), followed by the value to be associated with that configuration item. When administrative constraint is desired, the administrator uses a colon symbol (":") instead of the equals sign symbol. The use of the colon character symbol with any configuration item prevents that value from being overridden at any subsequent level.

Similarly, administrative constraint may be applied at the user level to prevent override at the process level if the particular item constrained has not already been constrained at the system level. Also, administrative constraint can be used to set configuration items for which override is not permitted by individuals having less authority than the system administrator. An example of such a configuration item is the association of a particular authority to a particular user. Assume that the user identifier of a database administrator is specified in the system level source file and it is desired not to permit any user to override that setting at either the user or process level or other subsequent level. Therefore, this would be accomplished by applying the administrative constraint at the system level as follows. The value of the user identifier of the database administrator is specified using the colon character symbol between the configuration item associated with the specification of the database administrator and the value being supplied. In this case, the authority could be supported by appropriate access control to the system file.

While administrative constraint allows an administrator, or those acting in a administrative role, to limit override at subsequent configuration levels, software constraint allows the software that calls the configuration system software to have some control as to the allowable levels at which configuration items may be set. Such constraint is applied through the use of an extra parameter that is passed to the configuration system software. The parameter is coded to specify a configuration level for which no subsequent level of configuration override will be accepted. Software constraint is useful in configuring hardware-related parameters that apply across the system for which it makes no sense to allow override by a particular user or process. Also, software constraint is useful for security or authority related information. It will be noted that software constraint, in contrast to administrative constraint, applies constraint at the level determined by the software and not by an individual who can update the configuration files. In accordance with the teachings of the present invention, software constraint operates in conjunction with administrative constraint to provide the desired operational results. In the preferred embodiment, a particular type of parameter interface is used to communicate with the configurable software components in an efficient manner.

A further feature or of the multilevel configuration system of the present invention is the provision of positive reporting wherein all of the configuration items that are received by the calling software are reported. Such reporting is performed by the configuration system software after all file location determination and file existence checks have been made and after multiple level override and override constraints have been applied or processed. Such reporting is useful in situations in which the calling software or application program is not operating properly. Determining if such software is configured properly and as intended are important factors in diagnosing the source of a problem. With positive reporting, only a single report has to be examined to determine these factors.

A further aspect or component of the configuration system of the present invention is the use of record position independent grouping. This technique uses a group name as a header of each record within a particular group. Hence, the technique allows the grouping of sets of configuration items into related groups without having to be concerned about the ordering of records within a particular configuration file.

The configuration system of the present invention combines ease of use features for configuration at administrator and user levels as well as providing a simple programmable interface for those software components requiring configuration services. This is accomplished without giving up restrictions that may be administratively imposed or required by the particular software components.

The above objects and advantages of the present invention will be better understood from the following description when taken in conjunction with the accompanying drawings.

BRIEF DESCRIPTION OF THE DRAWINGS

FIGS. 4b and 4c illustrate in greater detail, the administrative and execution phases of operation of FIG. 4a.

DESCRIPTION OF THE PREFERRED EMBODIMENT

FIG. 1

Figure 1:
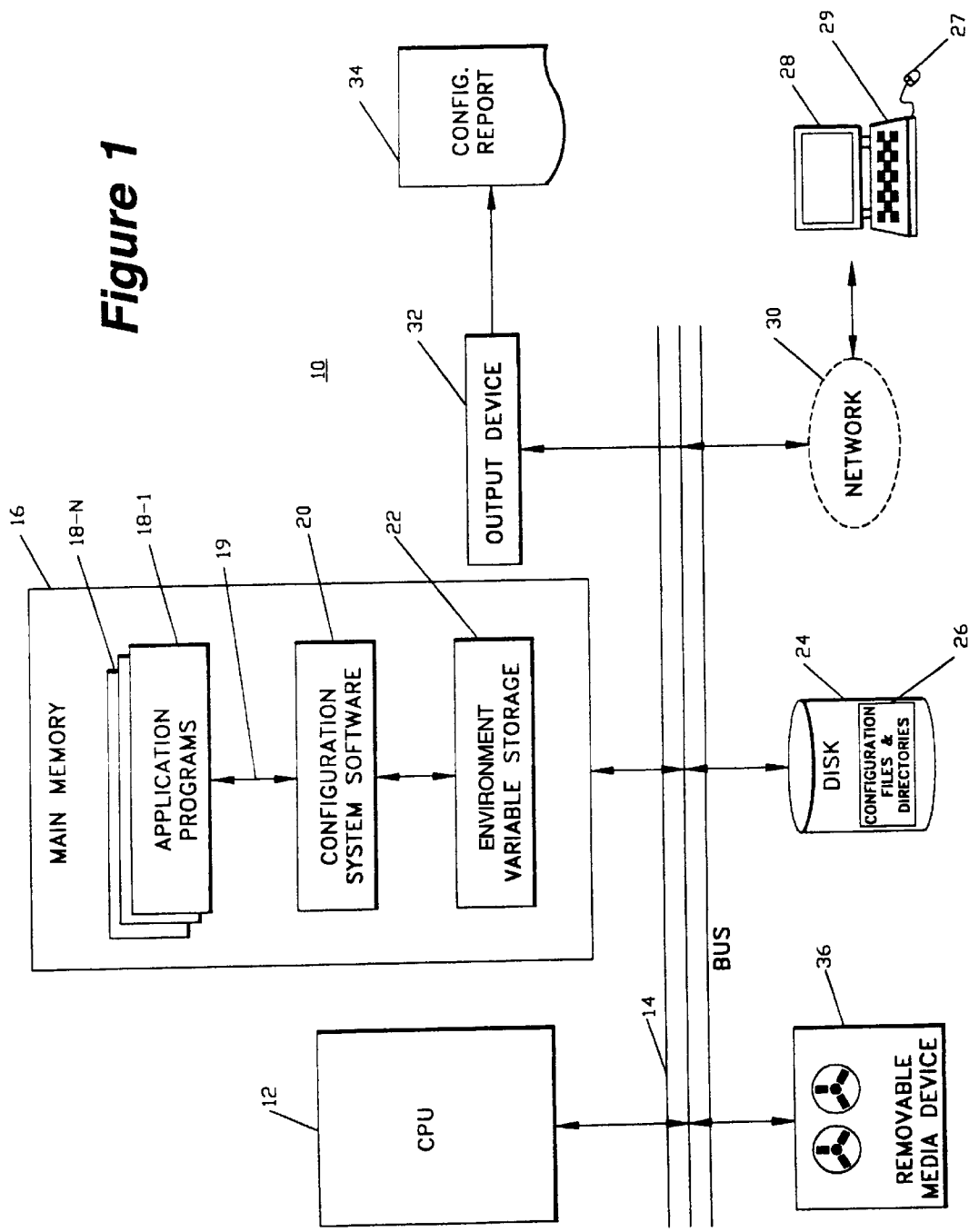
FIG. 1 is an overall block diagram of a data processing system that utilizes the configuration system of the present invention.

FIG. 1 is a block diagram of a conventional data processing system 10 that utilizes the configuration system of the present invention. As shown, the system 10 includes a digital processing unit 12 which connects to a system bus 14 in common with a plurality of units. The units include a removable media device 36, such as a CD-ROM or tape device, a random access memory (RAM) 16, a mass storage device 24, such as a disk device, an output device 32, such as a printer device and an input/output device 28, such as a workstation. As indicated, workstation 28 connects to bus 14 either locally or remotely via a network 30 (e.g. LAN or WAN). Workstation 28 includes a keyboard 29 and an input-pointing device such as a mouse 27. For example, workstation 28 may be a conventional personal computer.

As indicated, the disk mass storage device 24 includes a storage area for the different levels of configuration files and the directories in which these files logically reside. The memory 16 is used serves as the system's main memory and provides storage for the executing application programs 18-1 through 18-n, the configuration system of the present invention labeled as configuration system software 20 and the environment variable storage 22. In the preferred embodiment, environment variable storage 22 utilizes a particular type of data structure that will be described in greater detail with reference to FIG. 5. The configuration system or configuration system software 20 will be described in greater detail with reference to FIGS. 2b, 2c and 3. The configuration system software 20 communicates with application programs 18-1 through 18-n over a configuration interface 19. This interface is used by the configuration system software 20 to manage or configure such programs as discussed in greater detail with reference to FIG. 2a. The system also includes a reporting facility, not shown, that is used by the configuration system to report the configuration values used by the application programs. This report can be output by the output device 32 receiving information over the bus 14 from the configuration system software 20.

For the purpose of the present invention, the architecture of system 10 may be regarded as conventional in design and may for example utilize a mainframe computer system such as the DPS9000 manufactured by Bull HN Information Systems Inc. which operates under the control of the GCOS8 operating system.

FIG. 2a

Figure 2A:
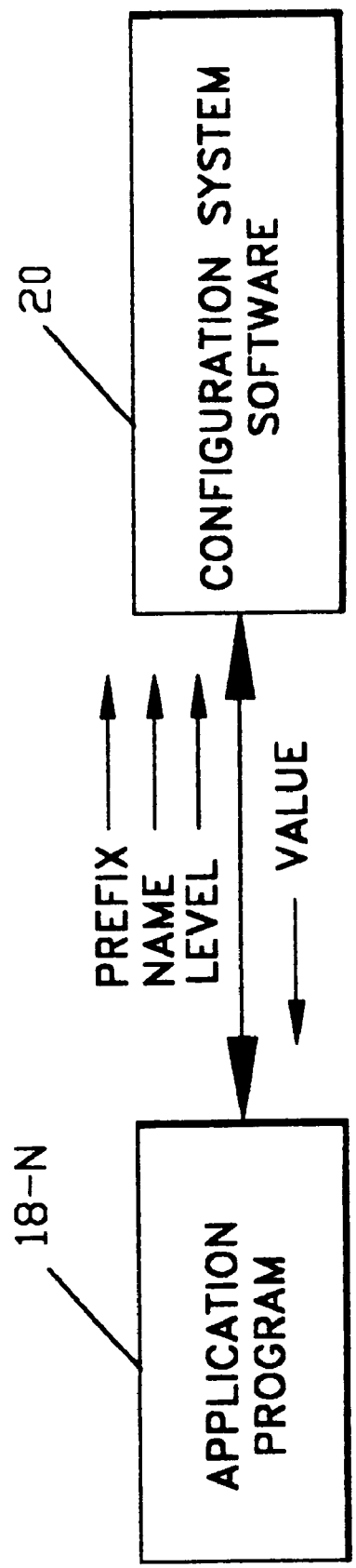
FIG. 2a illustrates in greater detail, the interface between application programs and the configuration system of FIG. 1.

FIG. 2a shows in greater detail, the interface 19 utilized by an application program that needs configuration information and the configuration system software. As indicated, the particular application program 18-n calls the configuration system software 20 passing the parameters designated as prefix, name, and level. The prefix parameter is a grouping identifier that is used to separate the configuration parameters into a number of sets of related items or groups wherein each group would be associated with a particular prefix. The grouping aspect of the present invention will be described in further detail with reference to block 240 of FIG. 2b.

The name parameter is associated with the particular item to be configured. It is the name of the "environment variable" to be set. Environment variables are described in more detail with reference to block 200 of FIG. 2b. The level parameter is used by the calling software (i.e., a particular application program in execution) to limit the configuration level for which a value is requested. The configuration levels are explained in greater detail with reference to block 210 of FIG. 2b and the calling software constraint of multilevel override is described in greater detail with reference to block 230 of FIG. 2b.

When the configuration system software 20 returns control to the application program 18-n, it returns with the value that is requested following its application of multi-level resolution and applicable constraints. If the application program 18-n has requested a configuration item for which no value has been set, then the configuration system software 20 returns a null value. The application program 18-n can test for this value and if such a value is returned, the application program may associate a default value for the configuration item requested.

FIG. 2b

Figure 2B:
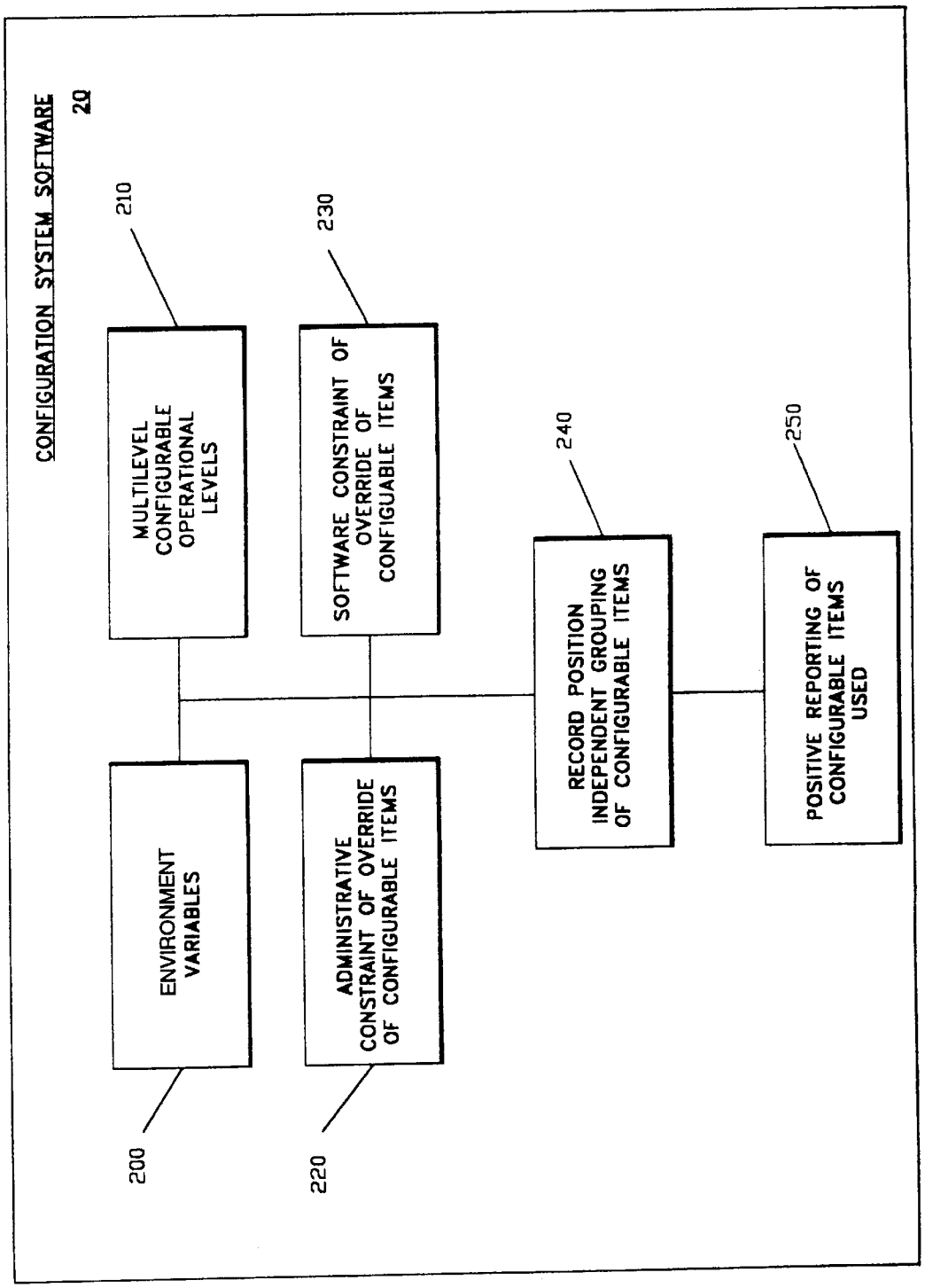
FIG. 2b illustrates the conceptual components that comprise the configuration system of the present invention.

FIG. 2b illustrates in greater detail, the conceptual components of the configuration system software 20. These components collectively operate to provide the configuration system of the present invention. As indicated, the configuration system software 20 includes the following components:

environment variables component 200;
a multiple-level configuration component 210;
an administrative constraint of override component 220;
a software constraint of override component 230;
a record position independent grouping component; and
a positive reporting component.

These conceptual components are described below in terms of their operation, significance, and benefits.

a. Environment Variables Component 200

This component implements the concept of environment variables. With the concept of environment variables, configuration files contain a series of assignment statements. Though other syntaxes can be used, environment variable assignment records are data strings that typically consist of the name of a configuration item, followed by an assignment operator, then followed by the value to be associated with the configuration item. This follows a well-known syntax used by many programming languages. The following examples illustrate the use of such syntax:

1. a=1
2. user_name=John

Figure 2C:
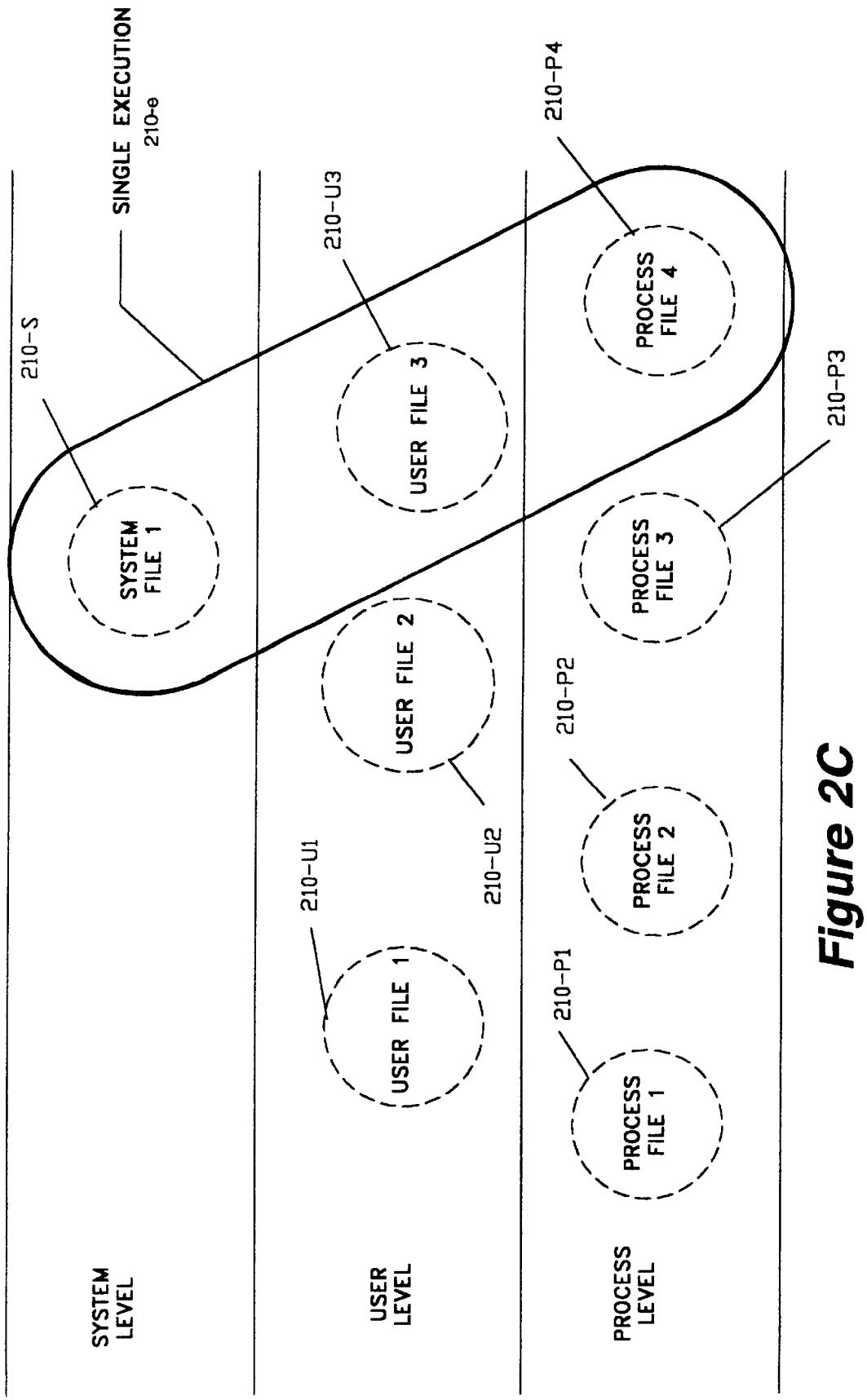
FIG. 2c illustrates the relationship among the multilevel configurable operational levels of FIG. 2b.

With environment variables, the association of values to named items (the variables) is separate from the querying of those variables to determine the associated values. The "environment variable" concept was selected to implement the preferred embodiment since configuration using environment variables is a simple yet powerful technique and is used by a number of computer systems and applications.

b. FIG. 2c Multi-level Configuration Component 210

In the present configuration system that utilizes a multiple-level system, more than one source of configuration is used to determine the configuration value to be passed back to a calling application program or software component requiring configuration information. In the preferred embodiment, the sources of configuration are text files. In the preferred embodiment, a maximum of three levels is utilized in the multiple-level system although more levels could conceivably be used. Furthermore, in the preferred embodiment, these levels are designated as the system level, the user level, and the process level. As illustrated in FIG. 2c by elements 210-s through 210-p4 (i.e., 210-s, 210u1 through 210-u3, and 210-p1 through 210-p4), there may be zero or one files at the system level, zero or more files at the user level, and zero or more files at the process level. That is, the existence of configuration files at any of the levels is optional indicated by the dotted lines around each of the elements 210-s through 210-p4. Though there may be more than one file at the user and the process level, a maximum of one file is utilized at each of these levels for a particular program execution as indicated by element 210-e in FIG. 2c which consists of a system file 210-s, a user file 210-u3 and process file 210-p4.

The multiple-level configuration system component 210, therefore reads and parses the contents of the system level file if it exists, a single user level file, if it exists, and a single process file, if it exists. The name of the system level file, including its location within the file system of the system 10 upon which it resides, is hard-coded within the configuration system software 20. For example, the complete pathname of the system level file may be designated as "sys_sitedata/_config/envir" where "sys_sitedata" is a root directory within a multiple root file system. This directory is dedicated to the storage of system information while "config" is the name of a directory under "sys_sitedata", and "envir" is the name of a file within the "_config" directory. The name of the user level file is hard-coded within the configuration system software 20, but its location within the file system is determined, in part, by the value of the user identifier under which the application program is being run. For example, the pathname of a user level file may be designated as "user1/_config/envir" where "user1" is a root directory dedicated to a user identified within the system as "user1", "_config" is a directory under "user1", and "envir" is a file within the "_config" directory. Thus, continuing this naming example, the user level configuration file for a user identified within the system as "user2" would be named "user2/_config/envir". The process level file may have any name since the name of the file to be used for a particular process (i.e., the application program to be executed) is supplied during the request to start the process (e.g. by an "exec" call). It may be passed as a parameter to the service that starts processes within the system 10 or, as in the Job Control Language (JCL) based batch environment of the system of the preferred embodiment, the name of the process level file may be supplied as a parameter of a JCL record. In the preferred embodiment, the directory portion of the pathname need not be supplied in the JCL, since a particular directory within the user's file structure is assumed. For example, the directory may be the same one used for the user level file, but instead of "envir", the file name is supplied within a JCL image. For example, suppose the JCL image to invoke a program named "prog1" is designated by the following:

$ run rufile=system,runame=prog1,p_env=myfile where the p_env option is used to specify the user level configuration file where the containing directory is assumed to be <user>/_config, and where "<user>" represents the user identifier of the user under which the job or process is being executed. In this case, the full pathname of the process level file used by the configuration system software 20 would be "<user>/_config/myfile".

Given the existence of system, user, and process files, the multiple level configuration system software 20 component implements a method to be described later, that determines a resultant value for each configuration item requested by the calling application program or software that invokes the configuration system 20. Values for particular configuration items may be specified within any or all of the files at the different levels. When different values are specified for a particular configuration item at different configuration levels, the multilevel configurable levels component 210 resolves the apparent conflict with an override technique. In general, the component 210 implements the override technique as follows. The component 210 overrides values for a particular configuration item specified at the system level by the value specified for the configuration item at the user level and may override values specified at the system or user level by the value specified for the configuration item at the process level.

Consider an example in which a particular configuration item is set to the value of "1" at the system level, the same configuration item is set to the value of "2" at the user level, and the same configuration item is set to a value of "3" at the process level. Using the above override rules, component 210 would return a resulting value of "3" to the application program/software requesting the value associated with the particular configuration item. As discussed above, the existence and use of files at any of the levels is optional. In the same example, if the process level file was not utilized or if the particular configuration item were not specified in the process level file, component 210 would return the value "2" the calling application program. In the previous example, assume that the user level file was not utilized or that the particular configuration item was not specified in the user level file. In this case, component 210 would override the value supplied at the system level by the value supplied at the process level and the value returned to the calling application program would still be "3". In the same example, if a value for the particular configuration item is supplied at the system level file but is not supplied at either the user level or process level file, component 210 would return to the calling software, the value of "1" supplied at the system level.

The above described technique of override implemented through multiple levels as defined in component 210 is combined with two different types of available constraints to this overriding, administrative constraint, and software constraint represented by components 220 and 230 in FIG. 2b. These components will now be described in greater detail.

c. Administrative Constraint of Override Component 220

The different levels of configuration may be associated with different types of users of system 10. For example, the system level would normally be associated with a system administrator, an individual or group of individuals that may have the responsibility for setting the configuration system defaults for the entire system. For some configuration items, the override system described above may be suitable. For other configuration items, however, it may be desirable for the system administrator to set values that cannot be overridden at the user or process levels, levels normally associated with the user that runs programs on the system. In these cases where the administrator does not want to permit override at the user or process level, the present invention provides the concept of administrative constraint represented by component 220. Administrative constraint of a configuration item is accomplished syntactically. In the preferred embodiment, configuration items normally are assigned values by specifying the name of the configuration item followed by an equals sign ("="), followed by the value to be associated with that configuration item. When administrative constraint is desired, instead of the equals sign symbol, the colon character (":") is used. The values for configuration items specified with the colon character may not be overridden at any subsequent level. For example, if a particular configuration item is specified at the system level with a colon, it may not be overridden at the user level, nor may be it overridden at the process level. Attempts to override items that are administratively constrained by component 220 do not result in error, rather, the constrained value is returned to the calling application program or software. Administrative constraint may also be applied at the user level to prevent override at the process level, if the particular item constrained has not already be constrained at the system level.

Administrative constraint is used to set items for which override by those with less authority than the system administrator (or whoever has the ability to set the contents of the system level file) is not permitted. An example of such a configuration item might be the association of a particular authority to a particular user. For example, if the user identifier of the database administrator is specified in the system level file, it may not be desirable to allow any user to override that setting at their user level or at the process level. Therefore, administrative constraint would be applied at the system level. That is, in the preferred embodiment, the value of the user identifier of the database administrator would be specified using the colon character between the configuration item associated with the specification of the database administrator and the value to be supplied, such as the following:

database_administrator: frank d. Software constraint of Override Component 230

While administrative constraint allows an administrator to limit override at subsequent configuration levels, software constraint as provided by component 230 allows the application program or software that calls the configuration system 20 to have some control as to the allowable levels at which configuration items may be set. This capability is of value for configuration items that apply globally across the system. Software constraint is applied through the use of an extra parameter passed to the configuration system software 20 that specifies a configuration level for which no subsequent level of configuration override will be accepted. The level parameter specifies the lowest level (with the system being the highest and the process being the lowest) at which a value is acceptable For example, if the calling application program or software is requesting the configuration value associated with a particular configuration item, but does not want to permit override at the process level, it would pass an indication of the user level as one of the parameters to the configuration system 20. This indicates that the software being configured is only willing to accept the value specified at the system level or the value specified at the user level (if no value was supplied at the system level, or if a value was specified at the system level and the user level and user level override was permitted). If the application program or software is only willing to accept a value specified at the system level, it would specify the system level in the associated parameter. As with administrative constraint, with software constraint, attempts to override at a level subsequent to the one specified by the software as the lowest in which it accept values, do not result in an error condition. The lower level setting is merely ignored.

An example wherein software constraint might be useful would be the configuration of hardware-related parameters that apply across the system since there is no reason to allow any override for a particular user or process. It might also be used for security or authority related information. In contrast to administrative constraint, in software constraint, the level at which constraint is applied is determined by the software and not by the person who can update the configuration files. In the preferred embodiment, software constraint operates in conjunction with administrative constraint. This is described in greater detail in FIG. 3.

e. Record Position Independent Grouping Component 240

On a system such as like system 10 that runs various different applications, it can be useful to have a single configuration system that can be used for the different applications. For this situation, it can be useful to have a means of associating sets of configuration items into related groups. In addition, for applications that require many different configuration items, it can also be useful to split the various configuration items into groups. For example, there may be a number of configuration items related to printing, another set of configuration items for formatting, and still yet another set of configuration items related to file locations. One method of grouping configuration items that exist in a single file is though the use of section headers. This has been a commonly used technique for MS-DOS based programs. Often these types of files have a suffix of ".INI". Section headers are enclosed in brackets. For example, the header for a section containing printer information might be represented as "[Printer]".

Application programs often need to modify such as header based files, such as when an application is installed or when the user changes a configuration item within a program via a configuration interface. For the application program to make an addition, deletion, or modification of a configuration item within this type of file, it, or an underlying service, must locate the relevant section, then the relevant configuration item.

In contrast to a header based file, a record position independent grouping technique of the preferred embodiment eliminates the need to locate the particular section. In fact, the order of the records in the entire file does not effect the resulting configuration. The preferred embodiment of the configuration system 20 includes a record position independent grouping component 240. Related configuration items can still be grouped, but instead of using a header that must immediately precede the group, the group name becomes the header of each record within the group. For example, if three configuration items in a printing group are designated as "lines_per_page" and "font" and "font_size", with record position independence, they might appear as follows:

printing lines_per_page=55;

printing font=Courier; and printing font_size=12.

Although related items may be on adjacent lines within such a file, it does not matter if they are not.

f. Positive Reporting Component 250

As mentioned earlier, in a multiple level configuration system 20, there may be more than one user level configuration file and more than one process level file. For any particular program execution, a maximum of one system level file, one user level file, and one process level file will be used. The user identifier under which the program is executing determines which user level file will be used. A job control language option or a parameter to the process creation service determines which process level file is used. When determining which combination of files were accessed for configuration information for a particular execution, one must know the information that determined which files were used. Since the use of each file is optional, that is, it is not mandatory that a file is utilized at each or any level, one must determine the existence of each file. In addition, to determine which values the calling software received, the user would have to examine the content of each configuration file used for the particular execution and apply the multiple level override method. This is complicated by the possibility that the content of the files may have changed since they were read by the configuration system. Furthermore, the methods/algorithms of both administrative override limiting and software override limiting would also have to be applied. Overall, determination of the values used by the software might be a time consuming, error prone, and even inaccurate activity. These issues are addressed by the concept of positive reporting represented by component 250.

In some systems, configuration reporting is limited to reporting error conditions, such as invalid configuration items and invalid values specified. With the concept of positive reporting, all the configuration items that are received by the calling application program or software component are reported. This reporting is performed by component 250 after all the file location determination and file existence checks have been made and after multiple level override and override constraint algorithms have been applied. For the purposes of the present invention, such reporting can be implemented using conventional reporting services. Typically, this reporting would be separate from the standard application output, that is, the report could be separately spooled to a printer or directed to a log file.

One example where positive reporting is extremely useful is in a situation in which the calling software or application program is not operating properly. Determining if it is configured properly and as intended may be very important factors to be determined. With positive reporting, only a single report need be examined to determine these factors. For positive reporting in the preferred embodiment, component 250 reports the following items for a particular program execution:

1. the names of the files accessed at each configuration level;
2. the group area identifier of the configuration item (see grouping component described above);
3. the name of the configuration item;
4. the resultant value associated to the configuration item return to the caller;
5. the level at which the value returned to the caller was specified;
6. the name of the file in which the configuration value returned was specified; and
7. whether or not override was permitted.

It will be noted that not all configuration assignments contained in the configuration files accessed are reported. The component 250 reports only information for items that were returned to the calling software. For example, if a particular configuration item is specified at the system level and the user level, and override at the user level was permitted, component 250 reports only the information for the user level assignment. Component 250 reports whether or not override was permitted or not which may have been determined by the syntax utilized at a higher level. This also means that there may be configuration items that are specified in the accessed configuration files that are not used at all by the calling application program or software. Component 250 does not report these items and the items do not result in an error condition. This capability of not reporting unused items can be useful in situations such as, for example, when multiple versions of a program or application are run where a particular configuration item is used in only one of the versions.

Positive reporting does not necessarily imply that no negative reporting occurs. Reporting of items, such as invalid configuration values, range violations, incompatible combinations of configuration settings may still occur and would usually be the responsibility of the calling application program or software. In the preferred embodiment, the calling software or application program uses a programmatic interface that shares output logic with the configuration system software. This interface allows error messages associated with particular configuration items to be placed in the same report and immediately following the positive reporting of the configuration item.

FIG. 3—CONFIGURATION SYSTEM LOGIC

Figure 3:
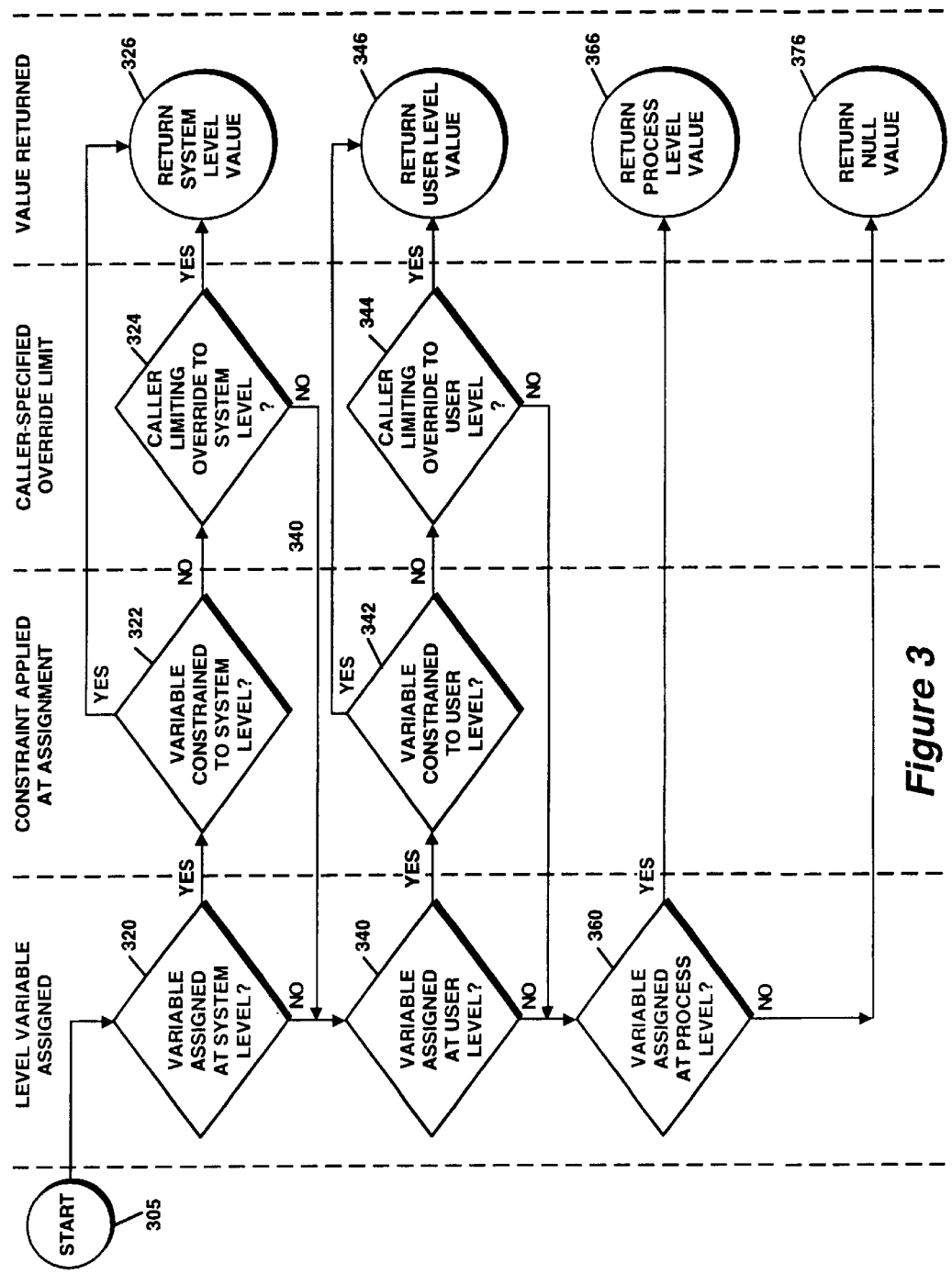
FIG. 3 illustrates in greater detail, the logical operational flow of the configuration system of the present invention.

FIG. 3 illustrates the logic of used by the configuration system software 20 of the present invention to return a value in a multi-level environment with possible constraints applied. The logic includes components 200 through 220 of FIG. 2b. This logic is utilized when an application program has called the configuration system software 20 and the configuration files, if any, have already been read and the contents thereof parsed and stored in memory 22.

The flow starts at block 305. The configuration system software 20 determines if the variable requested has been assigned at the system level as indicated in block 320. If it has not been assigned at the system level, the configuration system 20 determines if the variable requested has been assigned at the user level as indicated in block 340. If it has not been assigned at the user level, the configuration system 20 determines if the variable requested as been assigned at the process level as indicated in block 360. If it has not been assigned at the process level, the configuration system 20 returns a null value as indicated in block 376.

If the requested variable has been assigned at the system level as indicated in block 320, the configuration system 20 determines if the variable has been constrained to the system level as indicated in block 322. This is the application of administrative constraint of Override of Configuration Items that is represented by component 220 of FIG. 2b. If the variable has not been constrained to the system level as indicated in block 322, then the configuration system 20 determines if the caller (i.e., the calling application program) is limiting override to the system level (i.e., block 324). This is the application of software constraint of override of configurable items represented by block 230 of FIG. 2b. The calling application program specifies this override level limit with the "level" parameter using the configuration interface 19 of FIG. 2a. If the caller is limiting override to the system level as indicated in block 324, then the configuration system 20 returns the value set at the system level (i.e., block 326). If the variable has been constrained to the system level as indicated in block 322, then configuration system 20 returns the value set at the system level (i.e., block 326). If the variable has been not constrained to the system level as indicated in block 322, and the caller is not limiting override to the system level (i.e., block 324), then processing continues as indicated in block 340.

If the requested variable has been assigned at the user level as indicated in block 340, the configuration system 20 determines if the variable has been constrained to the user level (i.e., block 342). If the variable has not been constrained to the user level as indicated in block 342, then the configuration system 20 determines if the caller is limiting override to the user level (i.e., block 344). If the caller is limiting override to the user level as indicated in block 344, then the configuration system 20 returns the value set at the user level (i.e., block 346). If the variable has been constrained to the user level as indicated in block 342, the configuration system 20 returns the value set at the user level (i.e., block 346). If the variable has been not constrained to the user level as indicated in block 342, and the caller is not limiting override to the user level (i.e., block 344), then processing continues as indicated in block 360.

If the requested variable has been assigned at the process level as indicated in block 360, then the configuration system 20 returns the value set at the process level (i.e., block 366).

An examples section provides additional examples of how the logic of FIG. 3 operates in parsing the different sets of configuration items values according to the teachings of the present invention.

FIG. 5

Figure 5:
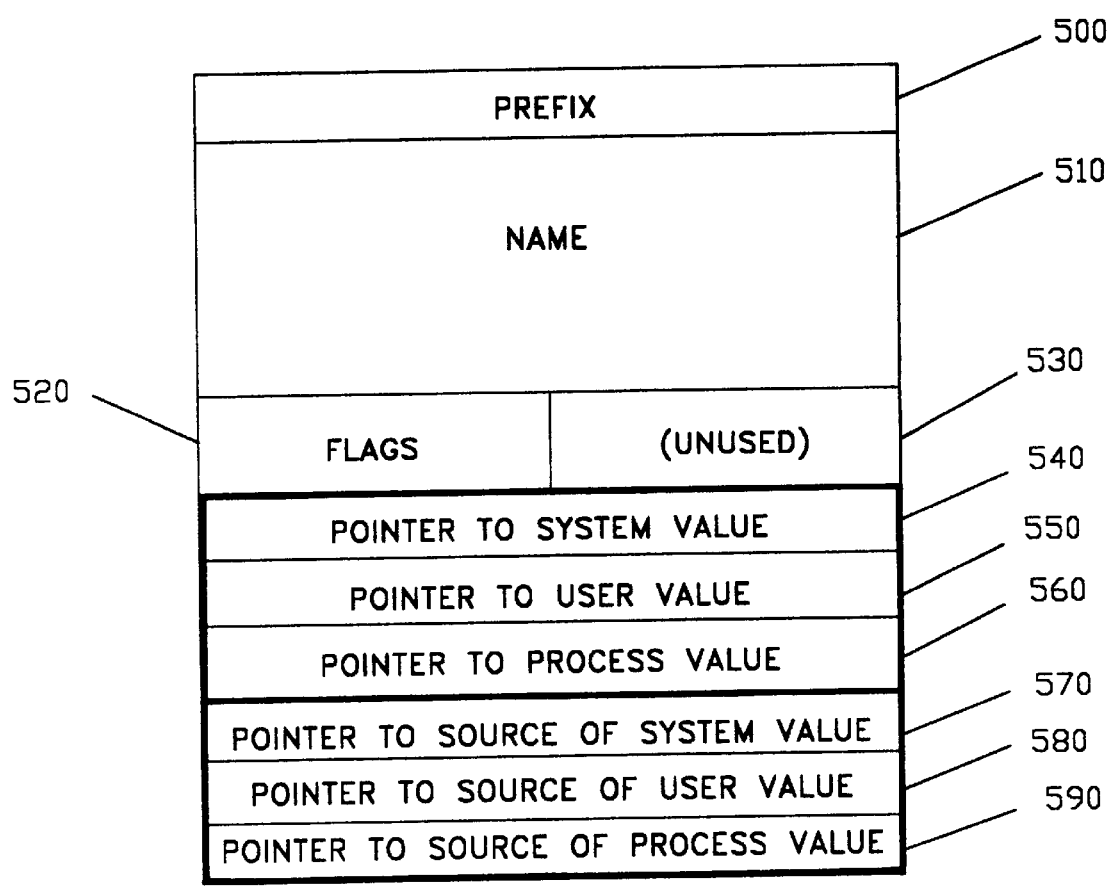
FIG. 5 illustrates the basic data structure utilized by the configuration system of the present invention.

FIG. 5 illustrates the basic data structure of the preferred embodiment used for storing configuration item information once such items have been parsed by the configuration system 20 from the configuration files. Instances of this data structure is stored in a conventional binary tree structure utilizing conventional tree search routines. It should be noted that other storage representations and data structures could be used for this purpose.

As indicated, the data structure includes a prefix field 500, a name field 510, a flags field 520, an unused field 530 in addition to pointer fields 540 through 590. The prefix field 500 is used to hold the prefix of the configuration item. The prefix is a parameter provided by an application program to the configuration system 20 via configuration interface 19 as shown in FIG. 2a. It is the grouping name provided by block 240 of FIG. 2b. The name field 510 is used to store the name of the configuration item. The flags field 520 are used to hold binary information for each level, such as whether or not a value was specified at that level, whether or not override is permitted, and whether or not information for the configuration item has already been printed in a configuration report. The remaining fields serve as pointers to specific portions of memory utilized by configuration system 20. More specifically, the fields 540 through 560 are used to store pointer values for referencing dynamically allocated portions of memory that hold the values of the configuration items designated by the pointers contained in fields 540, 550, and 560. The fields 570, 580 and 590 are used to store pointer values for referencing the dynamically allocated portions of memory that hold the file paths of the configuration file from which the values were obtained. As indicated, the pointers for the values and the source file paths are recorded for the system, user, and process levels.

The test for which branch of the binary tree to search consists of a comparison of prefix values. If the prefixes are equal, then the comparison of the name is used. The tree is populated when the files are read. This occurs during the first call to the configuration system software by an application program. During this and subsequent calls for configuration information, the tree is traversed at which time the logic described in FIG. 3 is applied. The tree structure exists in memory associated with an executing program, that is, each application program utilizing the services of the configuration system has its own tree and potentially different configuration items and values.

DESCRIPTION OF OPERATION

With reference to FIGS. 1 through 5, the operation of the preferred embodiment of the present invention will now be described with particular reference to FIGS. 4a through 4c.

FIG. 4a

Figure 4A:
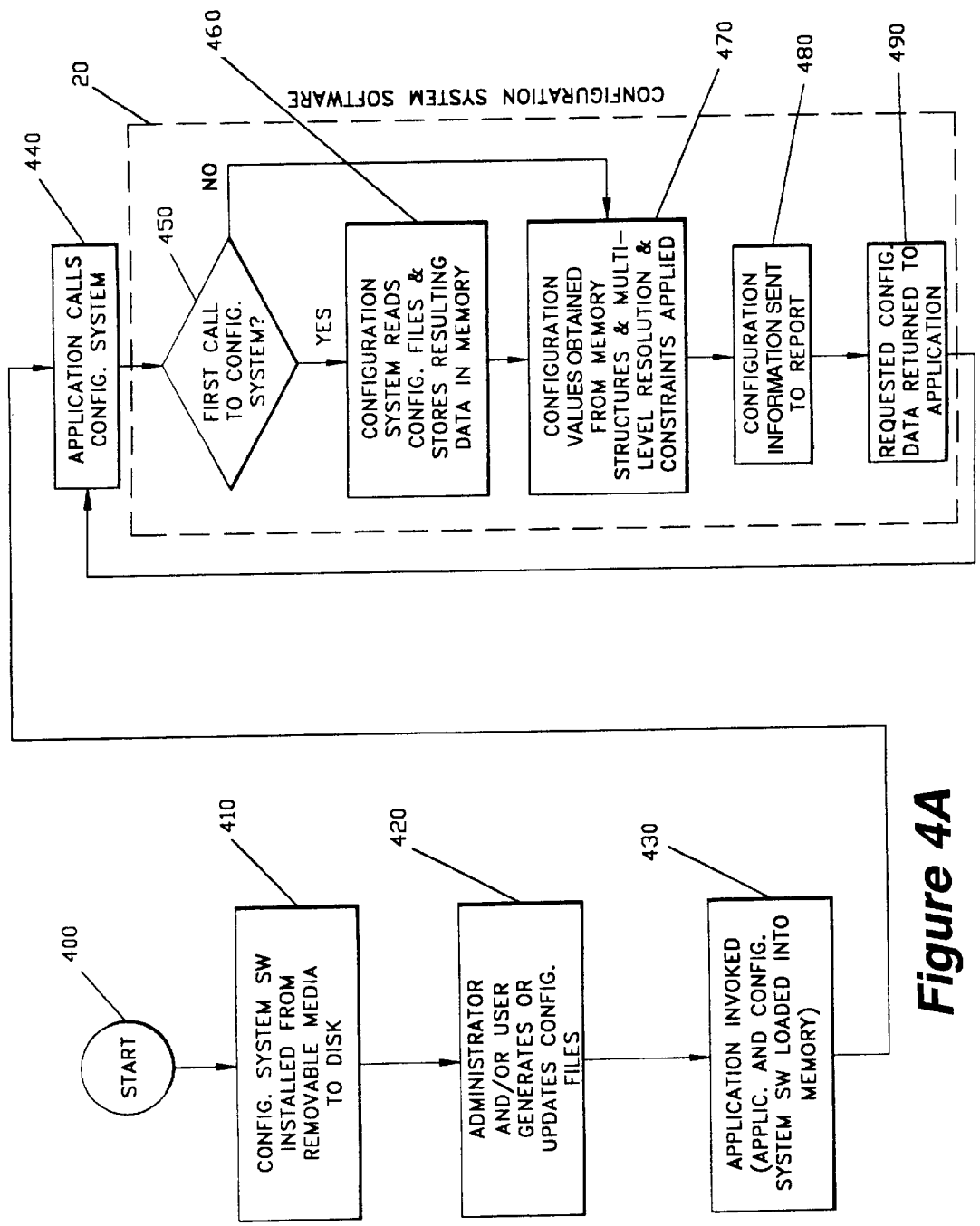
FIG. 4a is a flow diagram used to illustrate the different phases of operation in utilizing the method of the present invention.

FIG. 4a illustrates the typical operational scenario of the installation, administration, and the application execution time operation of the configuration system of the present invention. As indicated, the flow of operation starts with block 400. The configuration system software 20 is installed from removable media contained on device 36 of FIG. 1 and transferred to disk mass storage device 410. The administrator and/or user generate and populate the configuration files or update the content of such files as indicated in block 420. The application program is invoked, causing the application, or portions thereof, and the configuration system, or portions thereof, to be loaded into main memory 430.

When a particular application program requires configuration information, it calls the configuration system 20 as indicated in block 440. As indicated in block 450, the configuration system 20 checks if it is the first call made to the configuration system 20 by the application program. If it is the first call, then the configuration system 20 reads the appropriate configuration files, parses the contents, and stores the resulting data into memory 460. As indicated in block 470, the configuration system software 20 obtains the configuration values from disk storage device 24 and applies the appropriate override processing in conjunction with administrative and caller supplied constraints if any, utilizing the logic of FIG. 3. The configuration system software 20 stores the parsed configuration values in instances of the data structure of FIG. 5. As discussed above, these instances are in turn stored in a conventional binary tree structure. This enables more efficient access to such information through the use of conventional tree search routines.

As indicated in block 450, if it is not the application program's first call to the configuration system 20, the configuration system software 20 skips the processing of the files and performs the operations of block 470, wherein the configuration system software 20 obtains the configuration values as described above. Once the configuration system software 20 has obtained the values as indicated in block 470, the configuration system software 20 sends the values and associated information to the report component 250 as indicated in block 480. The requested configuration data is then returned to the calling application 490. The steps represented by blocks 450, 470, 480, and 490 are repeated for each subsequent call to the configuration system software 20 made by the calling application. A particular configuration item may be requested by the calling application more than once, but it will only be listed in the configuration report once.

Figure 4B:
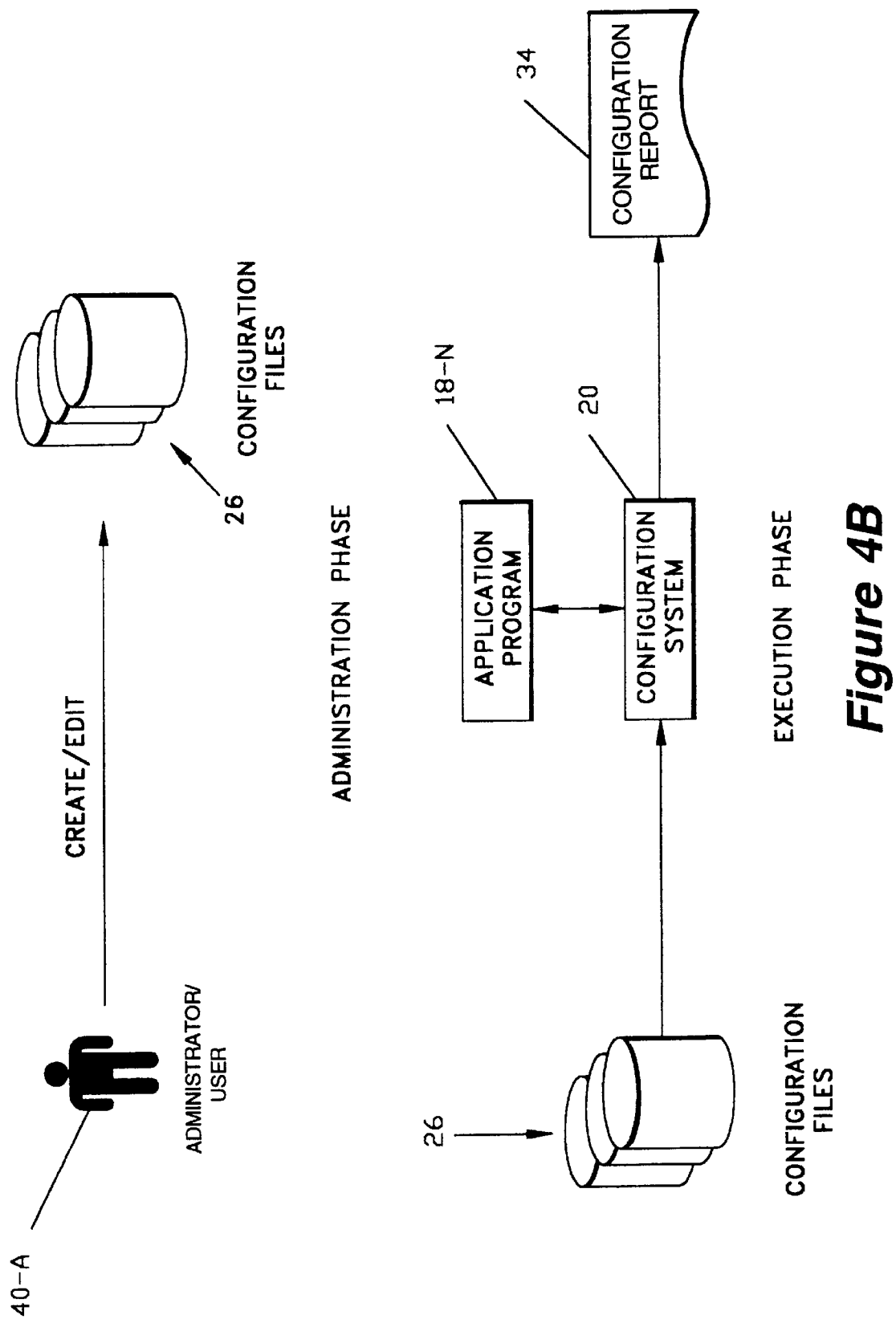
Figure 4C:
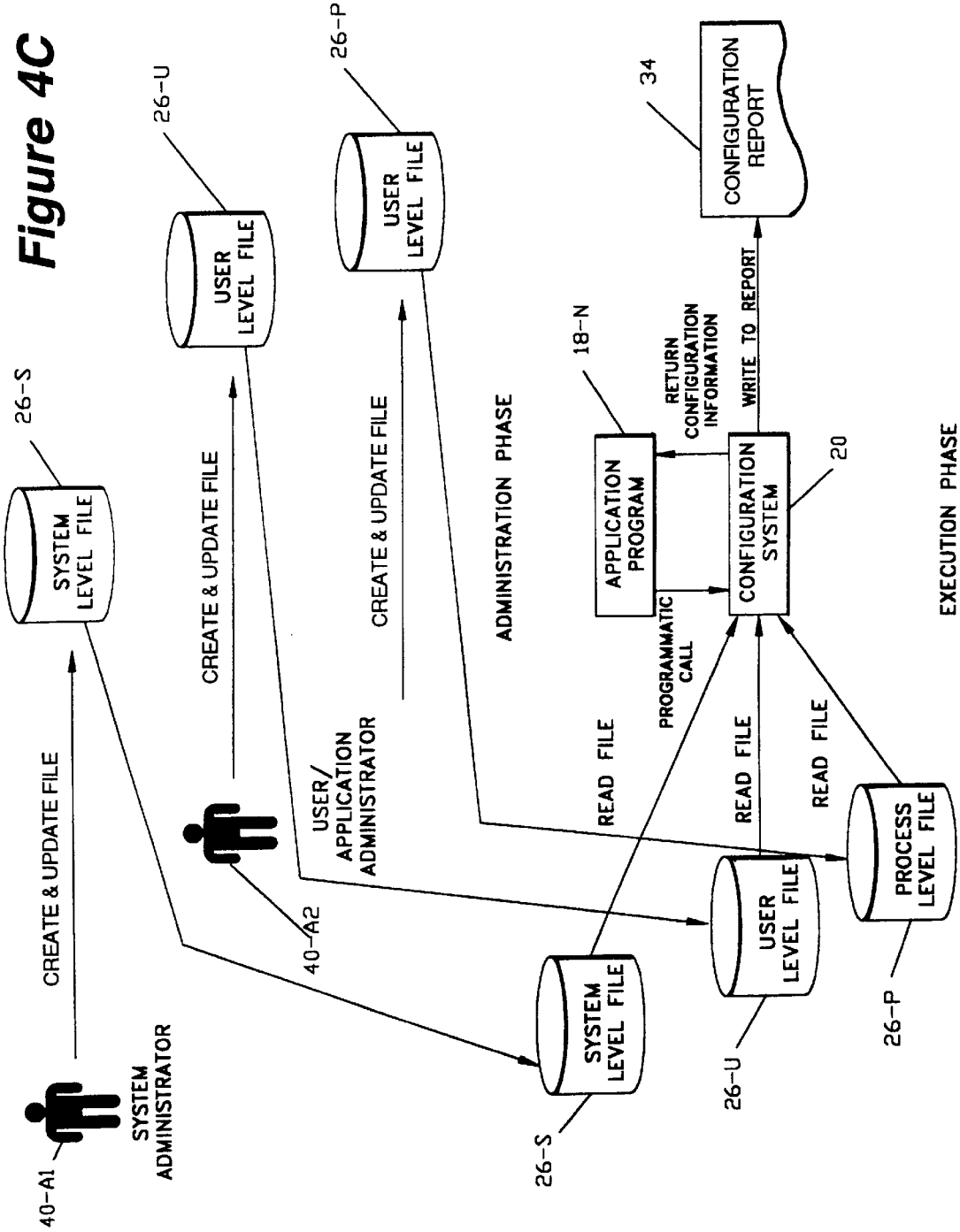

FIGS. 4*b* and 4*c*

FIGS. 4*b* and 4*c* show the typical administration and execution phases represented by blocks 430 and blocks 440 through 490 of FIG. 4*a*. FIG. 4*b* shows the high level view of these phases. During the administration phase, the administrator and/or user 40-a creates, if necessary, and edits the contents of the configuration files 26. During the execution phase the execution files 26 are used as input to the Configuration system software 20 when it is called by an application program 18-n. Configuration information is passed back to the application program 18-n and a configuration report 34 is generated as a byproduct.

FIG. 4*c* is a more detailed view of the items shown in FIG. 4*b*. Typically a system administrator 40-al would be responsible for creating the system level file 26-s, if it does not already exist, using input facilities, such as workstation keyboard 29 and utilizing a conventional text editor for adding and updating information contained in that file. Another user, such as an application administrator or perhaps an end user 40-a2 would have the authority for creating, if necessary, and updating the information contained in the user level file 26-u and/or a process level file 26-p. As described earlier, for a particular execution, the system level file 26-s, if existing, the user level file 26-u for the user running the application, if such a file exists, and the process level file 26-p, if one is associated with the running process, is read by the configuration system software 20 when it is invoked by the application program 18-n. The configuration system software 20 generates a configuration report 34 summarizing the values reported to the application using the report facilities described above.

Configuration System Utilization Examples

The following provides additional examples illustrating the different aspects of the configuration system of the present invention. In these examples, the term "userid" is to be regarded the same as "user". Additional more specific examples that relate to database application programs are provided in Appendix IV of the cited parent application.

I. Examples of Constrained Override

Given a set of configuration categories, xx, yy, and zz, and a set of configuration items, aaaa, bbbb, cccc, dddd, eeee, fff, gggg, and hhhh, a text file, system1, containing the following:

xx aaaa = 1
xx cccc = 2
xx dddd = 3
xx eeee: 4
xx ffff = 5 another text file, userid1, containing the following:

xx aaaa = 6
xx dddd = 7
xx eeee = 8
xx ffff: 9
xx gggg = 10 another text file, userid2, containing the following:

xx dddd = 11 and yet another text file process1, containing the following:

xx aaaa = 12
xx eeee = 13
xx ffff = 14
xx hhhh = 15 where the category names, configuration items, text file names, configuration values (and types), and programmatic call name are arbitrary for the example.

Also, given a process that has process level configuration file process1 associated with it, executing under a userid that has configuration file userid1 associated with it, running on a system that has the configuration file system1 associated with it.

Furthermore, given a callable function named "getenv" that implements the interface pictured in FIG. 2*a*.

| Example Call | Value Returned | Explanation |
|---|---|---|
| Administrator Constrained Override | | |
| getenv ("xx", "aaaa") | 12 | Value specified in process1 overrides the values specified in userid1 and system1. |
| getenv ("xx", "bbbb") | null | Value not specified in system1, userid1, or process1. Software will use coded default, if any. |
| getenv ("xx", "cccc") | 3 | Value specified in system1 only. |
| getenv ("xx", "dddd") | 7 | Value specified in userid1 and userid2. Since the assumption is that we are running under the userid associated with userid1, the value specified in userid1 is used. (If we were running under the userid associated with userid2, the value specified in userid2 would be used.) |
| getenv ("xx", "eeee") | 4 | Value specified in system1, userid1, and process1, however it was specified in system1 with override denied, therefore the value specified in system1 is returned. |
| getenv ("xx", "ffff") | 9 | Value specified in system1, userid1, and process1. Value was specified in system1 with override permitted. userid1 specified a value to override system1 and did not permit further override so the specification in process1 was ignored. |

-continued

| Example Call | Value Returned | Explanation |
|---|---|---|
| getenv ("xx", "gggg") | 10 | Value only specified in userid1. |
| getenv ("xx", "hhhh") | 15 | Value only specified in process1. |
| Software Constrained Override | | |
| getenv ("xx", "aaaa", "SYSTEM") | 1 | Caller is limiting override by only accepting values at the SYSTEM level. |
| getenv ("xx", "aaaa", "USERID") | 6 | Caller is limiting override by only accepting values at USERID level or higher (SYSTEM). |

II. Examples of Syntax

The following are examples of the format of records that could be specified in the configuration files:

```
sql_cache max_local_cache_entries = 1000
VIRTUAL_MEMORY SWAP_FILE_SIZE=30M
Mail NewMailNotification = Yes
Mail MailNotificationMsg = You have mail.
admin_name db_admin : jdoe
```

It will be noted that white space is permitted between the prefix and the configuration item name, between the configuration item name and the assignment operator, and between the assignment operator and the value. The white space on both sides of the assignment operator is optional.

The value processed begins with the first non-white space character following the assignment operator until the last non-white space character in the record. If leading or trailing while space characters are required by the calling software, delimiter characters, such as quotation marks can be used as they will be processed as the first and last non-white space characters and returned to the caller as part of the value. The prefix and configuration item names should be implemented case-insensitive. It is the responsibility of the calling application program or software to convert the configuration values returned from string type to appropriate type required by the application program. The calling software also has the responsibility for checking for errors in value type or content. The calling software determines the case-sensitivity of the value returned.

III. Example of the Use of Categories

The following is an example of a configuration file:

```
dialup number1 = 555-1234
dialup number2 = 555-8000
dialup num_tries = 4
   ...
io_sys num_tries = 2
```

It will be noted that the configuration item "num_tries" exists with both the "dialup" and "io_sys" prefixes. The software responsible for the acquisition of dialup configuration values need not be aware that it is using a name that is also used by the io_sys software. In large and/or diverse systems, or systems with a number of externally implemented software components (such as commodity software), this conflict avoidance is important.

IV. Example of Reporting

With the multi-level configuration system that does know the possible configuration items that can be used, positive reporting must be provided. This allows users, administrators, and support personnel a simple means of determining the exact configuration set that was used. There are many formats that can be used for the configuration report. For example, the report might look like the following:

```
Completed Processing SYSTEM File: sys_admin/_config/envir
Completed Processing USERID FIle: jdoe/_config/envir
(Config) SQL_CACHE Item: MAX_CODE_SEQ_K Value: 20
Scope: SYSTEM Override Allowed: no Source: sys_admin/_config/envir
(Config) SQL_CACHE Item: TRACE Value: no
Scope: USERID Override Allowed: YES Source: jdoe/_config/envir
(Config) SQL_CACHE Item:
LOCAL_REPORT_ON_CLEAR Value: yes
Scope: USERID Override Allowed: YES Source: jdoe/_config/envir
(Config) SQL_CACHE Item:
MAX_LOCAL_CACHE_ENTRIES Value: 2500
Scope: USERID Override Allowed: YES Source: jdoe_config/envir
(Config) SQL_CACHE Item:
MAX_LOCAL_CACHE_WORDS Value: 3m
Scope: USERID Override Allowed: YES Source: jdoe/_config/envir
```

It will be noted in the above report that no process-level configuration file was processed. The existence of configuration files at any level is optional and the calling software should be prepared to deal with a null value returned (when no applicable configuration file exists) and apply a coded default value.

The reporting is not a repeat of the entire contents of the configuration files used, rather it reports the values used. For example, if a configuration item is specified in the system-level file and overridden in the userid-level file, only the configuration item processed in the userid-level file is reported. Furthermore, if a configuration item is specified in a configuration file and no software queries for its value, the configuration item is not listed in the report. This completes the end of the examples section.

From the above, it is seen how the configuration system of the present invention can be used to configure application programs for reliably imposing administrative requirements in conjunction with established user preferences.

While the present invention was described relative to particular examples, it will be obvious to those skilled in the art that the configuration system and method of the present invention should not be so limited. In addition, the configuration system and method are not limited to a particular type of system or system components. Additionally, it will be appreciated that certain terminology used in describing the preferred embodiment of the present invention may appear in a glossary included in the parent application. Such glossary terms for the most part are intended to be specific to database applications. Here, it will be understood that the terminology used herein is not so limited.

It will be appreciated that many changes may be made to the preferred embodiment of the present invention without departing from its teachings. For example, the present invention may be used in different types of data processing systems. The present invention may also be used with other data item formats, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method of configuring software components utilizing a computer program device comprising a computer storage media readable by a processing system and configuration software contained on the computer storage media which includes instructions executable by the processing system for configuring applications within the system, the applications utilizing externally provided values generally used for defining an execution environment for the applications, the method steps comprising:

(a) establishing a plurality of configuration files to be used in configuring applications being executed by the processing system, the files being associated with a plurality of different operational levels, each configuration file being used for storing the values associated with a corresponding number of configurable items for configuring the applications to be executed and the values of each level having a pre-established override capability with respect to values contained in the other levels;

(b) entering a number of values into the configuration files at selected different operational levels, the values being used for configuring the applications to be executed according to requirements specified at the different operational levels;

(c) in response to a call from an application, processing the configuration item values derived from corresponding locations of the plurality of configuration files according the override control capabilities established for the operational levels, and;

(d) returning the results of step (c) to the calling application.

2. The method of claim 1 wherein the method further includes the steps of:

(e) reading the configuration item values from the configuration files in response to a first call to the configuration system software and storing the resulting derived configuration item values into an allocated storage area.

3. The method of claim 2 wherein step (e) includes representing the results stored in the allocated area of memory in a structure for reducing application access time in retrieving derived configuration item values for each configuration item.

4. The method of claim 2 wherein the method further includes the step of:

(f) each application including a number of calls for requesting different ones of the derived values stored in step (e); and (g) each application further including facilities for imposing software constraints for providing control as to those operational levels at which configuration items may be obtained.

5. The method of claim 4 wherein the facilities of step (g) include an interface for imposing software constraints by passing parameters specifying an operational level for which no subsequent level of override is to be accepted.

6. The method of claim 5 wherein one type of software constraint applied is configuring hardware related parameters that apply across the system.

7. The method of claim 5 wherein another type of software constraint imposed involves use of security or authority related configurable items.

8. The method of claim 1 wherein the number of operational levels includes a first level used to define a number of basic configuration item values for generally executing applications within the processing system, a second level used to define a number of configuration item values that specialize the requirements for accommodating specific user needs and a third level used to define a number of configuration item values for specifying exception conditions anticipated during the execution of specific types of applications.

9. The method of claim 8 wherein the first level includes only a single file of default values setup by a system administrator that is assigned the lowest override control, the second level includes a number of configuration files setup by users that is assigned a next highest override control and the third level contains a number of files setup by the system administrator that is assigned the highest override control.

10. The method of claim 9 wherein the first level corresponds to a system level, the second level corresponds to a user level and the third level corresponds to a process level.

11. The method of claim 9 wherein execution of each application uses only one file from each of the first, second and third levels.

12. The method of claim 9 wherein each file within each level is designated by a unique name identifier that is partially hardcoded within the system configuration software.

13. The method of claim 9 wherein the first level file is located by the unique name identifier, each file within the second level is located by the unique name identifier and a user identifier under which the application is being executed and each file within the third level is located by an arbitrary name identifier supplied during starting of the application.

14. The method of claim 13 wherein the name identifier used for locating files within the third level corresponds to a parameter provided either by a service that starts the application or by a job control language record.

15. The method of claim 9 wherein the number of files contained within the second and third levels is optional.

16. The method of claim 9 wherein null values are returned when no value is specified for a particular configuration item at any level.

17. The method of claim 1 wherein the step of entering values includes entering predetermined constraint values for those configuration items of a particular level that are not to be overridden by values contained in subsequent operational levels.

18. The method of claim 17 wherein constraint values are imposed syntactically.

19. The method of claim 18 wherein each configuration item is assigned a value by specifying the name of the configuration item followed by a conventional programming symbol, followed by the value to be associated with the configuration item and wherein an administrative constraint is imposed by substituting a predetermined symbol in lieu of a conventional programming symbol.

20. The method of claim 18 wherein the predetermined symbol is a colon (:) and the conventional programming symbol is an equal sign (=).

21. The method of claim 18 wherein administrative constraint can be used to set those configuration items within a particular level that are not to be overridden by those users having less authority than the system administrator.

22. The method of claim 21 wherein one type of administrative constraint is specifying the name of an administrator, using the predetermined symbol for a particular configuration item.

23. The method of claim 1 further including the step of:

(g) in response to a predetermined call, accessing the plurality of configuration files for reporting the configured values used by executed applications to an administrator for viewing purposes.

24. The method of claim 23 wherein the configuration items reported include:
   names of files accessed at each operational level; a group area identifier of the configuration item; name of configuration item; resultant value associated with the configuration item returned to a calling application; level at which the configuration item value returned was specified; and whether or not override was permitted.

25. The method of claim 24 wherein the system configuration software reports only information for configuration items that are returned to a calling application.

26. The method of claim 24 wherein the calling application includes an interface for reporting error messages associated with particular configuration items for placement within a single report.

27. The method of claim 1 wherein the method further includes the step of:
   (h) associating sets of configuration items within an operational level into a number of related groups.

28. The method of claim 1 wherein the method further includes the step of:
   (i) dividing different ones of the number of configuration items of an operational level into a number of groups; and,
   (j) assigning a group name designation to each group that defines a particular category or type of configuration item so as to enable sharing of configuration items by different applications without conflict.

29. A software configuration system for use in a digital processing system which executes applications utilizing externally provided values normally used by the system to define an execution environment for the applications to be executed, the configuration system comprising:
   (a) a plurality of configuration files to be used in configuring applications being executed by the digital processing system, the files being organized into a plurality of different operational levels, each configuration file for storing the values representative of a corresponding number of configurable items for configuring the applications to be executed and the values of each level having a pre-established override control over the values of other levels;
   (b) an input facility for entering a number of values into the configuration files at selected different operational levels, the values being used for configuring the applications to be executed according to requirements specified at the different operational levels;
   (c) a processing facility for processing the configuration item values derived from corresponding locations of the plurality of configuration files according to the override control capabilities attributed to the pre-established operational levels in response to each call received from an application; and,
   (d) a return facility for returning results of processing in step (c) to the calling application.

30. The system of claim 29 wherein the configuration system further includes:
   (e) a mechanism for reading the configuration item values from the configuration files in response to a first call and storing resulting derived configuration item values into an allocated storage.

31. The system of claim 30 wherein the mechanism stores the results in a structure for reducing application access time in obtaining values for each configuration item.

32. The system of claim 30 wherein each application includes a number of calls for requesting different ones of derived values stored by the mechanism and each application further including facilities for imposing software constraints for providing control as to those operational levels at which configuration items may be obtained.

33. The system of claim 32 wherein the facilities include an interface for imposing software constraints by passing extra parameters specifying an operational level for which no subsequent level of override is to be accepted.

34. The system of claim 33 wherein one type of software constraint applied is configuring hardware related parameters to be applied across the system.

35. The system of claim 34 wherein another type of software constraint applied involves use of security or authority related configurable items.

36. The system of claim 29 wherein the number of operational levels includes a first level used to define a number of basic configuration item values for generally executing applications within the digital processing system, a second level used to define a number of configuration item values that specialize the requirements for accommodating specific user needs and a third level used to define a number of configuration item values for specifying exception conditions anticipated during the execution of specific types of applications.

37. The system of claim 36 wherein the first level includes only a single file of default values setup by a system administrator that is assigned the lowest override control, the second level includes a number of configuration files setup by users that is assigned a next highest override control and the third level contains a number of files setup by users that is assigned the highest override control.

38. The system of claim 37 wherein the first level corresponds to a system level, the second level corresponds to a user level and the third level corresponds to a process level and wherein execution of each application uses only one file from each of the first, second and third levels.

39. The system of claim 37 wherein each file within each level is designated by a unique name identifier that is partially hardcoded within the system configuration software.

40. The system of claim 37 wherein the first level file is located by the unique name identifier, each file within the second level is located by the unique name identifier and a user identifier under which the application is being executed and each file within the third level is located by the name identifier supplied during starting of the application.

41. The method of claim 40 wherein the name identifier used for locating files within the third level corresponds to a parameter provided either by a service that starts the application or by a job control language record.

42. The system of claim 37 wherein the number of files contained within the second and third levels is optional.

43. The system of claim 29 wherein entering predetermined constraint values for those configuration items of a particular level that are not to be overridden by values contained in subsequent operational levels and wherein constraint values are imposed syntactically.

44. The system of claim 43 wherein each configuration item is assigned a value by specifying the name of the configuration item followed by a conventional programming symbol, followed by the value to be associated with the configuration item and wherein an administrative constraint is imposed by substituting a predetermined symbol in lieu of a conventional programming symbol.

45. The system of claim 43 wherein the predetermined symbol is a colon (:) and the conventional programming symbol is an equal sign (=).

46. The system of claim 43 wherein administrative constraint can be used to set those configuration items within a particular level that are not to be overridden by those users having less authority than the system administrator.

47. The system of claim 46 wherein one type of administrative constraint is specifying the name of an administrator, using the predetermined symbol for a particular configuration item.

48. The system of claim 29 wherein in response to a predetermined call, the configuration system accesses the plurality of configuration files for reporting the configured values used by executed applications to an administrator for viewing purposes.

49. The system of claim 48 wherein the configuration items reported include: names of files accessed at each operational level; a group area identifier of the configuration item; name of configuration item; resultant value associated with the configuration item returned to a calling application program; level at which the configuration item value returned was specified; and whether or not override was permitted.

50. The system of claim 49 wherein the system configuration software reports only information for configuration items that are returned to a calling application.

51. The system of claim 49 wherein the calling application includes an interface for reporting error messages associated with particular configuration items for placement within a single report.

52. The system of claim 29 wherein the sets of configuration items are associated within an operational level into a number of related groups.

53. The system of claim 29 wherein different ones of the number of configuration items of an operational level are divided into a number of groups; and, a group name designation is assigned to each group that defines a particular category or type of configuration item so as to enable sharing of configuration items by different applications without conflict.

* * * * *